United States Patent
Nandy et al.

(10) Patent No.: US 12,341,684 B2
(45) Date of Patent: Jun. 24, 2025

(54) EFFICIENTLY FORWARDING BIDIRECTIONAL MULTICAST TRAFFIC AT A VIRTUAL GATEWAY DEVICE

(71) Applicant: Hewlett Packard Enterprise Development LP, Spring, TX (US)

(72) Inventors: Tathagata Nandy, Bangalore (IN); Subramanian Muthukumar, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/489,486

(22) Filed: Oct. 18, 2023

(65) Prior Publication Data

US 2025/0133009 A1   Apr. 24, 2025

(51) Int. Cl.
  *G06F 13/00* (2006.01)
  *H04L 12/18* (2006.01)
  *H04L 12/46* (2006.01)
  *H04L 45/00* (2022.01)
  *H04L 45/24* (2022.01)

(52) U.S. Cl.
  CPC .......... *H04L 45/22* (2013.01); *H04L 12/1886* (2013.01); *H04L 12/4641* (2013.01); *H04L 45/245* (2013.01)

(58) Field of Classification Search
  CPC . H04L 45/22; H04L 12/1886; H04L 12/4641; H04L 45/245
  USPC ......................................... 709/238, 239, 250
  See application file for complete search history.

(56) References Cited

U.S. PATENT DOCUMENTS

| | | | |
|---|---|---|---|
| 10,116,464 B2 * | 10/2018 | Lin ......................... | H04L 45/66 |
| 11,469,991 B1 * | 10/2022 | Mahadevan ............ | H04L 45/24 |
| 2016/0277210 A1 * | 9/2016 | Lin ......................... | H04L 45/16 |
| 2022/0337510 A1 * | 10/2022 | Mahadevan ............ | H04L 45/24 |

* cited by examiner

*Primary Examiner* — Kenneth R Coulter
(74) *Attorney, Agent, or Firm* — Yao Legal Services, Inc.

(57) ABSTRACT

A first network device in a network is provided. During operation, the first network device can elect the first network device as a designated forwarder (DF) of multicast traffic in a subnet for a Rendezvous Point (RP) of a multicast group. Here, the first network device can operate in conjunction with a second network device as a virtual gateway device of the subnet. The second network device can be elected as another DF for the RP. The first network device can determine whether the first network device is elected as a forwarding device based on a selection parameter. Upon determining that the first network device is elected as the forwarding device, the first network device can program, in the forwarding hardware, a forwarding entry for forwarding the multicast traffic. The first network device can then forward multicast traffic associated with the multicast group based on the forwarding entry.

20 Claims, 8 Drawing Sheets

EFFICIENTLY FORWARDING BIDIRECTIONAL MULTICAST TRAFFIC AT A VIRTUAL GATEWAY DEVICE

BACKGROUND

A network device, such as a switch, in a network may support different protocols and services. For example, the network device can support an overlay network formed based on tunneling and virtual private networks (VPNs). The network device can then facilitate overlay routing for a VPN over the tunnels.

BRIEF DESCRIPTION OF THE FIGURES

In the figures, like reference numerals refer to the same figure elements.

DETAILED DESCRIPTION

Figure 1:
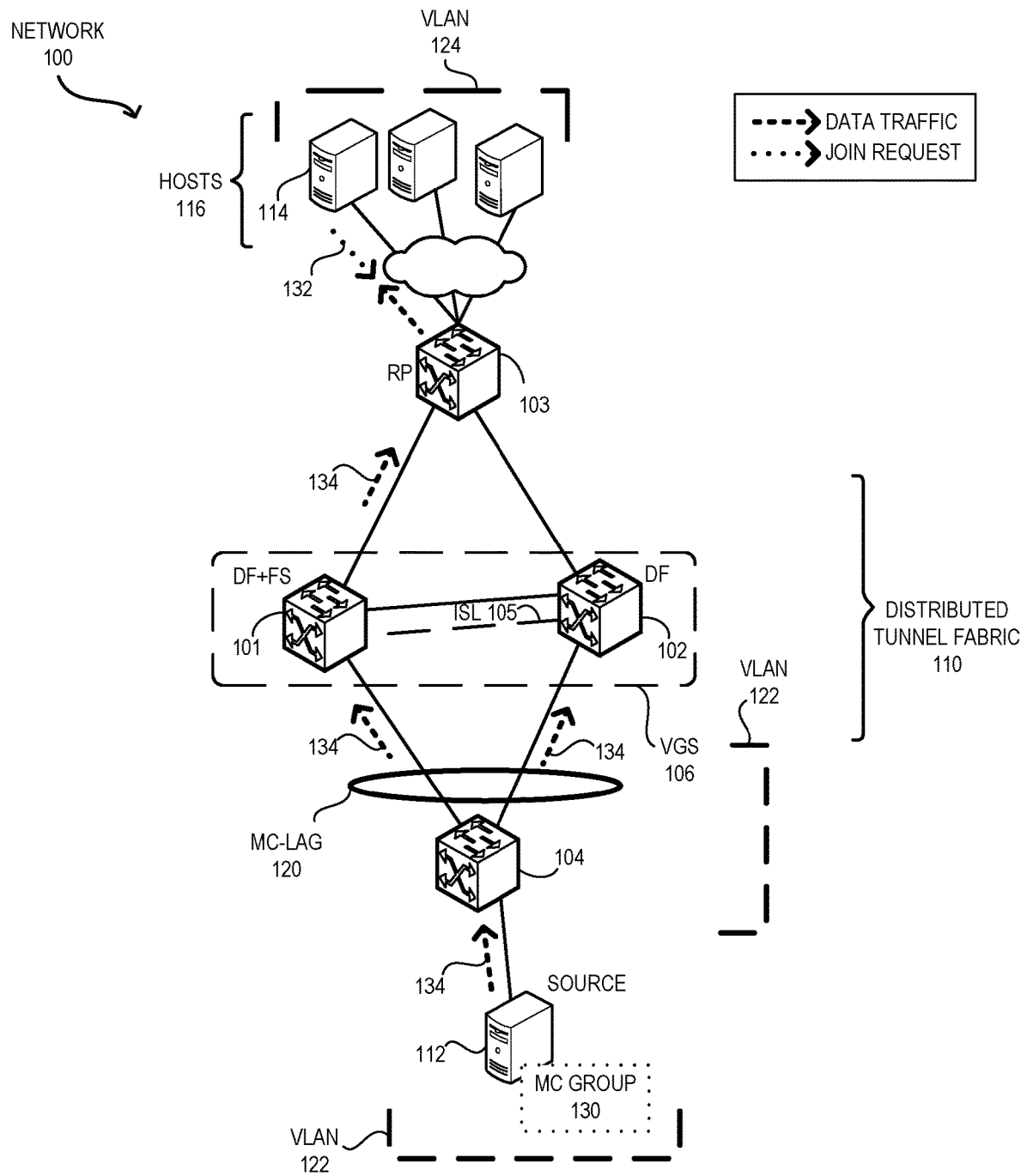
FIG. 1 illustrates an example of a virtual gateway device efficiently forwarding bidirectional multicast traffic from a source device, in accordance with an aspect of the present application.

In various Internet applications, multicast is frequently used to distribute content such as video from a source to multiple hosts via one or more network devices, such as switches. Efficient distribution of multicast traffic can improve the performance of a network. A network-layer multicast protocol, such as protocol-independent multicast (PIM), can be used for distributing content in a heterogeneous network. In some scenarios, a host can send a client join request (e.g., an Internet Group Management Protocol (IGMP) join request or a Multicast Listener Discovery (MLD) join request) to an upstream switch. The switch can be in an overlay network formed based on overlay routing for a VPN over a set of tunnels. For example, an Ethernet VPN (EVPN) can be deployed as an overlay over a set of virtual extensible local area networks (VXLANs).

To deploy a VPN over the tunnels, a respective tunnel endpoint may map a respective client virtual local area network (VLAN) to a corresponding tunnel network identifier (TNI), which can identify a virtual network for a tunnel. The TNI may appear in a tunnel header that encapsulates a packet and is used for forwarding the encapsulated packet via a tunnel. For example, if the tunnel is formed based on VXLAN, the TNI can be a virtual network identifier (VNI) of a VXLAN header, and a tunnel endpoint can be a VXLAN tunnel endpoint (VTEP). A TNI can also be mapped to the virtual routing and forwarding (VRF) associated with the tunnels if layer-3 routing and forwarding are needed. Since a VPN can be distributed across the tunnel fabric, a VPN over the tunnel fabric can also be referred to as a distributed tunnel fabric.

Since the fabric is an overlay network, a respective switch in the fabric can be a tunnel endpoint of one or more tunnels. The fabric can include a gateway device that can facilitate external communication for the fabric. As a result, any other switch of the fabric can communicate with a switch outside the fabric via the gateway device, thereby facilitating communication between networks. The gateway device of the fabric can be a physical or a virtual gateway device. A virtual gateway device can be a plurality of physical network devices operating in conjunction with each other as a virtual gateway device. For example, the virtual gateway device can be a virtual gateway switch (VGS), which can be a virtualized switch running a plurality of participating switches of the fabric.

The aspects described herein address the problem of efficiently forwarding bidirectional multicast traffic at the participating switches of a virtual gateway device by (i) electing each participating switch as a designated forwarder (DF); and (ii) electing one participating switch as a forwarding device, which can also be referred to as a forwarding switch (FS), and programming the forwarding entry for forwarding the multicast traffic in the hardware of the FS. Even though a respective DF of the virtual gateway device may receive the multicast traffic, only the FS forwards the multicast traffic to a recipient. Furthermore, if the FS becomes unavailable, another participating switch can detect the unavailability via an inter-device link, such as an inter-switch link (ISL), and start operating as the FS without DF reelection. In this way, the virtual gateway device can efficiently forward duplication-free bidirectional multicast traffic and ensure fast convergence during an unavailability event.

An overlay network, such as a distributed tunnel fabric, can be coupled to other networks via a gateway device. The gateway device can be a virtual gateway device, such as a VGS, in the overlay network. Typically, at least two switches can operate as a single switch in conjunction with each other to facilitate the VGS. Switches participating in the VGS can be referred to as participating switches. A respective participating switch can consider the other participating switches as peer participating switches (or peer switches). A respective pair of participating switches can be coupled to each other via an inter-device link (e.g., an ISL). The VGS can be associated with one or more virtual network addresses (e.g., a virtual Internet Protocol (IP) address and/or a virtual media access control (MAC) address). A respective tunnel formed at the VGS can use the virtual network address to form the tunnel endpoint. As a result, other tunnel endpoints (i.e., other switches) of the overlay network can consider the VGS as the other tunnel endpoint for a tunnel instead of any of the participating switches.

In the underlying network (or underlay network) of the fabric, a respective switch can establish a route to every other switch. The switch can use a routing protocol, such as the Border Gateway Protocol (BGP), to establish the route. To forward traffic toward the VGS, a respective switch in the fabric can perform a load balancing operation (e.g., based on hashing on a respective packet) and select one of the participating switches as the destination in the underlay network. As a result, the switch can forward the packet via a tunnel to the VGS in the overlay network while load balancing between the participating switches in the underlay network. Hence, an endpoint may forward a multicast control packet to one of the participating switches, which, in turn, can share the control packet with a peer participating switch via the ISL. Similarly, if the switch receives a multicast data packet via a tunnel, the switch can share the packet with the peer participating switch via the ISL.

A bidirectional multicast protocol, such as Bidirectional Protocol Independent Multicast (PIM) or BIDIR-PIM, can facilitate source-independent multicast traffic distribution. To do so, the multicast protocol can use a root-path multicast tree (RPMT), which can be rooted at a Rendezvous Point (RP), to distribute the multicast traffic. The multicast traffic distributed using the bidirectional multicast protocol can be referred to as bidirectional multicast traffic. The source devices send the multicast traffic to the RP, while the join requests associated with the requesting hosts are also sent to the RP. The RP can then forward the multicast traffic to the requesting hosts via the RPMT. In this way, the bidirectional multicast protocol can facilitate the distribution of multicast traffic without relying on source-specific multicast trees (SPMTs). Since a switch in a network does not need to maintain the states associated with individual source devices, the bidirectional multicast protocol can reduce the multicast processing overhead associated with maintaining the states.

To facilitate efficient distribution of bidirectional multicast traffic, a switch in a subnet is typically elected as a DF, which can be responsible for forwarding join requests to the RP and distributing traffic from the RP. With existing technologies, a VGS of a fabric can incorporate at least two participating switches operating as a single virtual switch. A DF election process can then elect one of the participating switches of the VGS to deploy a DF. If the elected switch becomes unavailable, the bidirectional multicast protocol may elect another participating switch of the VGS as the new DF. However, the convergence time for detecting the unavailability of a DF and electing a new DF can be substantial, leading to significant traffic loss. On the other hand, if multiple participating switches are elected as DFs to bypass the new DF election process during the unavailability, each of the DFs can forward traffic in the subnet. Consequently, there can be multiple traffic flows forwarding through the same subnet and cause flow duplication in the subnet.

To address these problems, one of the participating switches of the virtual gateway device, such as a VGS, can be elected as an FS. Since the VGS can include two or more participating switches, at least two participating switches can be elected as DFs. Hence, one of the participating switches can operate as an FS while operating as a DF. The participating switches can independently elect the FS from the DFs based on one or more selection parameters, such as network addresses, priority values, and user configurations. The other DFs of the VGS can be referred to as standby DFs. The bidirectional multicast protocol daemon, which can perform the operations associated with the bidirectional protocol instance on a respective participating switch, can maintain the forwarding states (e.g., in the software of the switch). On the other hand, only the FS can configure the corresponding forwarding entries in the forwarding hardware. As a result, even though the VGS can include multiple DFs, only the FS can forward the multicast traffic in the subnet or toward the RP.

To ensure high availability, a respective DF can receive the multicast traffic. For example, if the requesting hosts are reachable via the VGS, a respective DF can send a join request (e.g., a PIM join) to the RP. Accordingly, the RP can send the multicast traffic to a respective DF of the VGS. On the other hand, if the source is reachable via the VGS (e.g., through a multi-chassis link aggregation group or MC-LAG), a respective DF can receive the multicast traffic since the source and the VGS can remain in the same layer-2 segment (e.g., the same virtual local area network (VLAN)). To ensure that only the FS can forward multicast traffic from the VGS, the forwarding entry associated with the multicast traffic can only be programmed in the forwarding hardware of the FS. Accordingly, the switch operating as the FS can forward the multicast traffic to the RP.

From the perspective of the multicast daemon (e.g., a PIM daemon) running on a respective DF, the local switch (i.e., the switch running the multicast daemon) is elected as a DF. As a result, if the FS becomes unavailable, the other participating switch can already be elected as a DF. Consequently, the multicast daemon does not re-initiate the DF election process. Instead, the other participating switch can detect the unavailability via the ISL and readily program the forwarding entry in the forwarding hardware without requiring the multicast daemon to elect a new DF. Since each DF of the VGS can receive the multicast traffic, during the unavailability of the FS, the standby DF (i.e., the participating switch operating as a DF but not as the FS) can readily start forwarding the multicast traffic upon programming the entry. This allows efficient forwarding of bidirectional multicast traffic at the VGS and quick convergence during a failover.

In this disclosure, the term "switch" is used in a generic sense, and it can refer to any standalone network device or fabric switch operating in any network layer. "Switch" should not be interpreted as limiting examples of the present invention to layer-2 networks. Any device that can forward traffic to an external device or another switch can be referred to as a "switch." Furthermore, if the switch facilitates communication between networks, the switch can be referred to as a gateway switch. Any physical or virtual device (e.g., a virtual machine or switch operating on a computing device) that can operate as a network device and forward traffic to an end device can be referred to as a "switch." If the switch is a virtual device, the switch can be referred to as a virtual switch. Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1 illustrates an example of a virtual gateway device efficiently forwarding bidirectional multicast traffic from a source device, in accordance with an aspect of the present application. A network 100 can include a number of switches and devices, and may include heterogeneous network components, such as layer-2 and layer-3 hops, and tunnels. In some examples, network 100 can be an Ethernet network, InfiniBand network, or other network, and may use a corresponding communication protocol, such as Internet Protocol (IP), FibreChannel over Ethernet (FCOE), or other protocol. Network 100 can include a number of network devices, such as switches 101, 102, 103, and 104. A respective switch in network 100 can be associated with a MAC address and an IP address. An end device 112 can be coupled to switch 104. Similarly, a number of hosts 116, such as end device 114, can be reachable through switch 103 via one or more hops (denoted with a "cloud"). In other words, these end devices can be locally or remotely coupled to switch 104.

Switches 101 and 102 can be in a distributed tunnel fabric 110, where the switches can be coupled to each other via tunnels. Fabric 110 can include other switches not shown in FIG. 1. In fabric 110, tunnel encapsulation is initiated and terminated within fabric 110. Switches in fabric 110 may form a mesh of tunnels. Examples of a tunnel can include, but are not limited to, VXLAN, Generic Routing Encapsulation (GRE), Network Virtualization using GRE (NVGRE), Generic Networking Virtualization Encapsulation (Geneve), Internet Protocol Security (IPsec), and Multiprotocol Label Switching (MPLS). The tunnels in fabric 110 can be formed over an underlay network. The underlay network can be a physical network, and a respective link of the underlying network can be a physical link. A respective switch pair in the underlay network can be a BGP peer. The switches in the underlay network can use the BGP to establish routes via which encapsulated packets of fabric 110 are forwarded in the underlay network. A VPN, such as an EVPN, can be deployed over fabric 110.

In fabric 110, switches 101 and 102 can operate as a single virtual gateway device in conjunction with each other to facilitate a VGS 106. VGS 106 can operate as the gateway switch of fabric 110 and facilitate external communication for fabric 110. For example, VGS 106 can couple fabric 110 to an external network, such as an enterprise network or the Internet. VGS 106 can be associated with one or more virtual network addresses (e.g., a virtual IP address and/or a virtual MAC address). Consequently, both switches 101 and 102 can be associated with the virtual network addresses. The virtual network addresses allow switches 101 and 102 to facilitate high availability to each other. For example, if one of these switches becomes unavailable due to a failure or power cycle, the other switch can remain associated with the virtual network addresses and continue to receive and forward packets based on the virtual network addresses.

Moreover, a respective tunnel formed at VGS 106 can use the virtual network addresses to form the tunnel endpoint. As a result, either switch 101 or 102 can receive packets forwarded based on the virtual IP address. To efficiently manage data forwarding, switches 101 and 102 can maintain an ISL 105 between them for sharing control and/or data packets. ISL 105 can be a layer-2 or layer-3 connection that allows data forwarding between switches 101 and 102. ISL 105 can also be based on a tunnel between switches 101 and 102 (e.g., a VXLAN tunnel). It should be noted that VGS 106 may be configured on switches 101 and 102 without forming fabric 110.

Switch 104 can be coupled to VGS 106 via an MC-LAG 120. For example, switch 104 can be coupled to switches 101 and 102 via respective links. These links can be grouped together to operate as a logical or virtual link, which is represented by MC-LAG 120. End device 112 can belong to VLAN 122. Hence, VLAN 122 can be configured on the port of switch 104 that couples end device 112. VLAN 122 can also be configured for MC-LAG 120. As a result, the ports participating in MC-LAG 120 can be configured with VLAN 122. Furthermore, VLAN 124 can be configured on switch 103. End devices coupling switch 103, such as end device 114, can also belong to VLAN 124.

To support source-independent multicast traffic distribution in network 100, switches 101, 102, 103, and 104 can deploy a bidirectional multicast protocol, such as BIDIR-PIM. A multicast protocol daemon, such as a PIM daemon, can run on each of these switches and facilitate the corresponding operations. Switch 103 can be configured as an RP for a multicast group 130. Hence, switch 103 can also be referred to as RP 103 and be the root of an RPMT for multicast group 130. If a bidirectional multicast protocol is used to distribute traffic of multicast group 130, the bidirectional multicast traffic of multicast group 130 can be distributed via the RPMT without relying on an SPMT. In other words, upon receiving the multicast traffic of multicast group 130 via RP 103, a host does not attempt to switch to an SPMT to the source device.

Suppose that end device 112 is the source device of multicast group 130, and end device 114 is a host requesting the multicast traffic of multicast group 130. Source device 112 can then send the multicast traffic to RP 103. Similarly, to receive the multicast traffic of multicast group 130, a join request associated with host 114 can also be sent to RP 103. RP 103 can then forward the multicast traffic to host 114 via the RPMT. In this way, the bidirectional multicast protocol can facilitate the distribution of the multicast traffic of multicast group 130. Since switches 101, 102, and 104 may maintain the states associated with individual source devices, such as source device 112, the bidirectional multicast protocol can reduce the multicast processing overhead in network 100.

To facilitate efficient distribution of bidirectional multicast traffic, a switch in a subnet of network 100 is typically elected as a DF. The DF can be responsible for forwarding join requests to RP 103 and distributing traffic from RP 103. With existing technologies, a DF election process can then elect one of switches 101 and 102, such as switch 101, to deploy a DF. If switch 101 becomes unavailable, the multicast demon on switch 102 can initiate the election process and may elect switch 102 as the new DF. However, the convergence time for detecting the unavailability of switch 101 and electing switch 102 as a new DF can be substantial, leading to significant multicast traffic loss via VGS 106. On the other hand, both switches 101 and 102 are elected as DFs to bypass the new DF election process during the unavailability, each of switches 101 and 102 can forward traffic in the subnet. Consequently, there can be multiple traffic flows forwarding through the same subnet and cause flow duplication in the subnet.

To address these problems, one of the participating switches of VGS 106, such as switch 101, can be elected as an FS, while both switches 101 and 102 can be elected as DFs. Therefore, switch 101 can operate as the forwarding device of multicast traffic in VGS 106. Switches 101 and 102 can independently elect switch 101 as the FS from the DFs based on one or more selection parameters, such as network addresses, priority values, and user configurations. For example, both switches 101 and 102 can determine that a network address, such as the Internet Protocol (IP) address or the media access control (MAC) address, of switch 101 has a larger value than that of switch 102. Accordingly, they both elect switch 101 as the FS. Because switch 102 is elected as DF without being elected as the FS, switch 102 can be a standby DF. The selection parameters can also include a priority value or a user configuration. For example, the switch with a more significant priority value (e.g., a higher or lower priority value) can be elected as the FS. A user may also configure a switch as an FS.

The respective multicast daemon instances on switches 101 and 102 can maintain the forwarding states (e.g., in the software of switches 101 and 102). On the other hand, only switch 101 can configure the corresponding forwarding entries in the forwarding hardware. The forwarding entry for multicast group 130 can include MC-LAG 120 as the ingress interface and the point-to-point interface toward RP 103 as the egress interface. The interface toward RP 103 can be a tunnel interface of the tunnel between switches 101 and 103 in fabric 110. As a result, when switch 101 receives multicast traffic 134 associated with multicast group 130 from MC-LAG 120, switch 101 can forward the multicast traffic toward RP 103.

To receive multicast traffic of multicast group 130, host 114 can send a corresponding join request 132 to RP 103. When source device 112 starts sending multicast traffic 134, switch 104 can receive multicast traffic 134 toward RP 103. Because RP 103 is reachable from switch 104 via VGS 106 (e.g., through MC-LAG 120), switch 104 can send multicast traffic 134 via MC-LAG 120. Since switch 104 and VGS 106 can be in the same VLAN 122, both switches 101 and 102 can receive multicast traffic 134. However, in VGS 106, only switch 101 can program the forwarding entry associated with multicast traffic 134 in the forwarding hardware. Hence, switch 101 can forward multicast traffic 134 to RP 103, which, in turn, can forward multicast traffic 134 to host 114. If RP 103 is on VLAN 124, switch 101 can receive multicast traffic 134 on VLAN 122 and forward it on VLAN 124. On the other hand, switch 102 can discard multicast traffic 134 received from MC-LAG 120. If switch 101 becomes unavailable, switch 102 can become the new FS and program the forwarding hardware with the corresponding forwarding entry and start forwarding multicast traffic 134 to RP 103. In this way, the bidirectional multicast traffic can be efficiently forwarded from VGS 106 to RP 203 without duplication.

Figure 2:
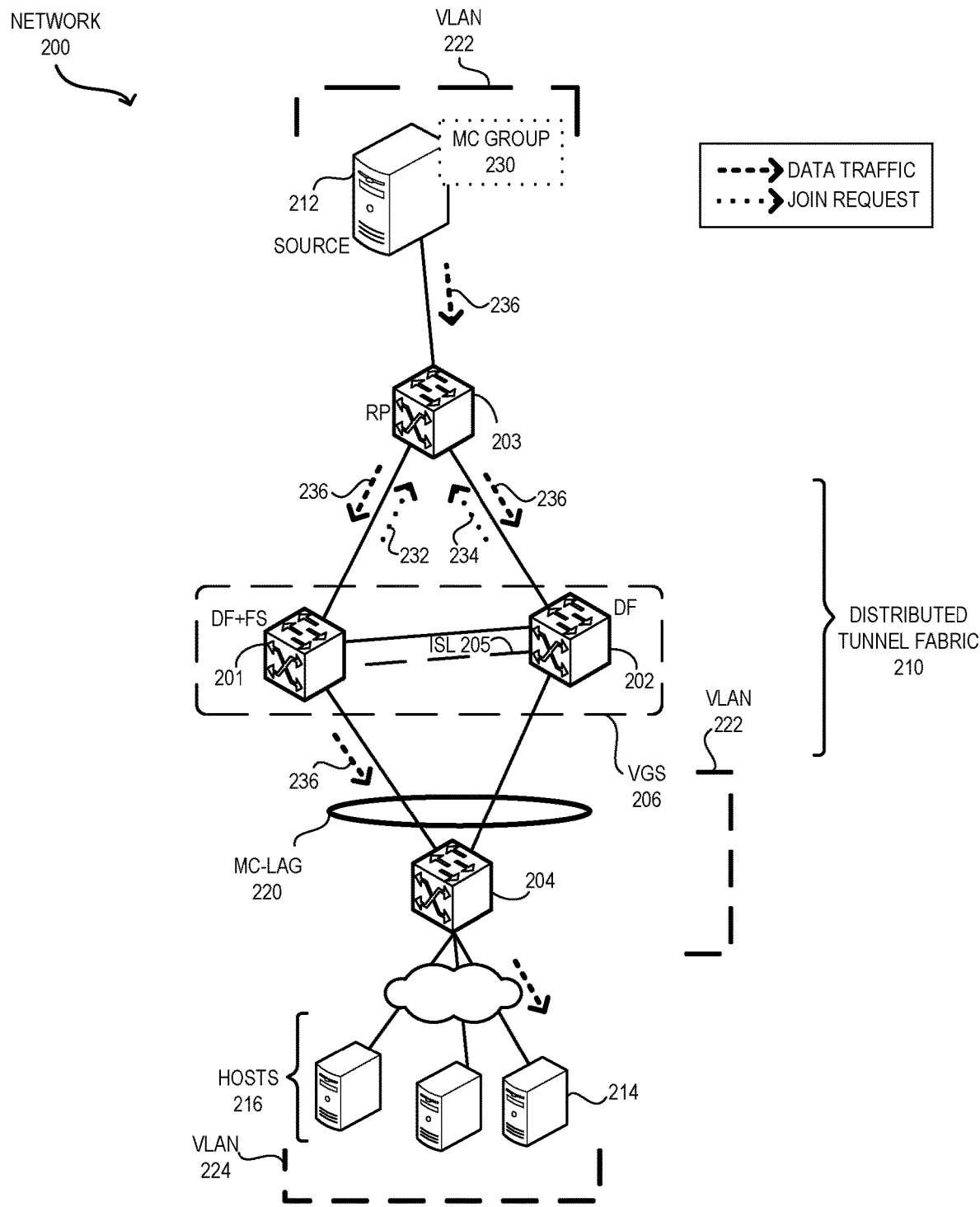
FIG. 2 illustrates an example of a virtual gateway device efficiently forwarding bidirectional multicast traffic from a Rendezvous Point (RP), in accordance with an aspect of the present application.

FIG. 2 illustrates an example of a virtual gateway device efficiently forwarding bidirectional multicast traffic from an RP, in accordance with an aspect of the present application. A network 200 can include a number of network devices, such as switches 201, 202, 203, and 204. A respective switch in network 200 can be associated with a MAC address and an IP address. An end device 212 can be coupled to switch 103. Similarly, a number of hosts 216, such as end device 214, can be reachable through switch 204 via one or more hops (denoted with a "cloud"). Switches 201 and 202 can be in a distributed tunnel fabric 210, where the switches can be coupled to each other via tunnels. Fabric 210 can include other switches not shown in FIG. 2. In fabric 210, tunnel encapsulation is initiated and terminated within fabric 210. Switches in fabric 210 may form a mesh of tunnels. The tunnels in fabric 210 can be formed over an underlying network (or an underlay network). A respective switch pair in the underlying network can be a BGP peer. The switches in the underlay network can use the BGP to establish routes via which encapsulated packets of fabric 210 are forwarded in the underlay network. A VPN, such as an EVPN, can be deployed over fabric 210.

In fabric 210, switches 201 and 202 can operate as a single virtual gateway device in conjunction with each other to facilitate a VGS 206. VGS 206 can operate as the gateway switch of fabric 210 and facilitate external communication for fabric 210. To efficiently manage data forwarding, switches 201 and 202 can maintain an ISL 205 between them for sharing control and/or data packets. Switch 204 can be coupled to VGS 206 via an MC-LAG 220. For example, switch 204 can be coupled to switches 201 and 202 via respective links. These links can be grouped together to operate as a logical or virtual link, which MC-LAG 220. End device 212 can belong to VLAN 222. Hence, VLAN 222 can be configured on the port of switch 203 that couples end device 212. VLAN 224 can be configured for MC-LAG 220. As a result, the ports participating in MC-LAG 220 can be configured with VLAN 224. Accordingly, VLAN 224 can be configured on switch 204. End devices coupling switch 203, such as end device 214, can also belong to VLAN 224.

Switch 203 can be configured as an RP for a multicast group 230. Hence, switch 203 can also be referred to as RP 203 and be the root of an RPMT for multicast group 230. If a bidirectional multicast protocol is used to distribute traffic of multicast group 230, the bidirectional multicast traffic of multicast group 230 can be distributed via the RPMT without relying on an SPMT. To efficiently forward bidirectional multicast traffic, one of the participating switches of VGS 206, such as switch 201, can be elected as an FS, while both switches 202 and 202 can be elected as DFs. Therefore, switch 201 can operate as the forwarding device of multicast traffic in VGS 206. Because switch 202 is elected as DF without being elected as the FS, switch 202 can be a standby DF. The respective multicast daemon instances on switches 201 and 202 can maintain the forwarding states.

Because source device 212 is reachable from RP 203, source device 212 can start sending multicast traffic 236 to RP 203. To receive multicast traffic of multicast group 230, host 214 can send a corresponding join request. Switch 204 can then send a network join request associated with multicast group 230. To receive multicast traffic 234 from RP, both switches 201 and 202, operating as the DF, can send network join requests 232 and 234, respectively, to RP 203. Join requests 232 and 234 can be source-independent join requests (e.g., a PIM (*, G) join) for multicast group 230. Upon receiving the join requests, RP 203 can then start forwarding multicast traffic 236 to both switches 201 and 202.

However, because switch 201 is elected as the FS, switch 201 can configure the corresponding forwarding entries in the forwarding hardware. The forwarding entry for multicast group 230 can include MC-LAG 220 as the egress interface and the point-to-point interface (e.g., a tunnel interface) for RP 203 as the ingress interface. As a result, when switch 201 receives multicast traffic 236 from RP 203, switch 201 can forward multicast traffic 236 to switch 204 (i.e., toward host 214) via MC-LAG 220. If RP 203 is on VLAN 222, switch 201 can receive multicast traffic 236 on VLAN 222 and forward it on VLAN 224. Because the forwarding hardware of switch 202 is not configured with the forwarding entry, upon receiving multicast traffic 236 from RP 203, switch 202 can discard it. If switch 201 becomes unavailable, switch 202 can program the forwarding hardware with the corresponding forwarding entry and start forwarding multicast traffic 236 to switch 204. In this way, the bidirectional multicast traffic can be efficiently forwarded from VGS 206 toward host 214 without duplication.

Figure 3A:
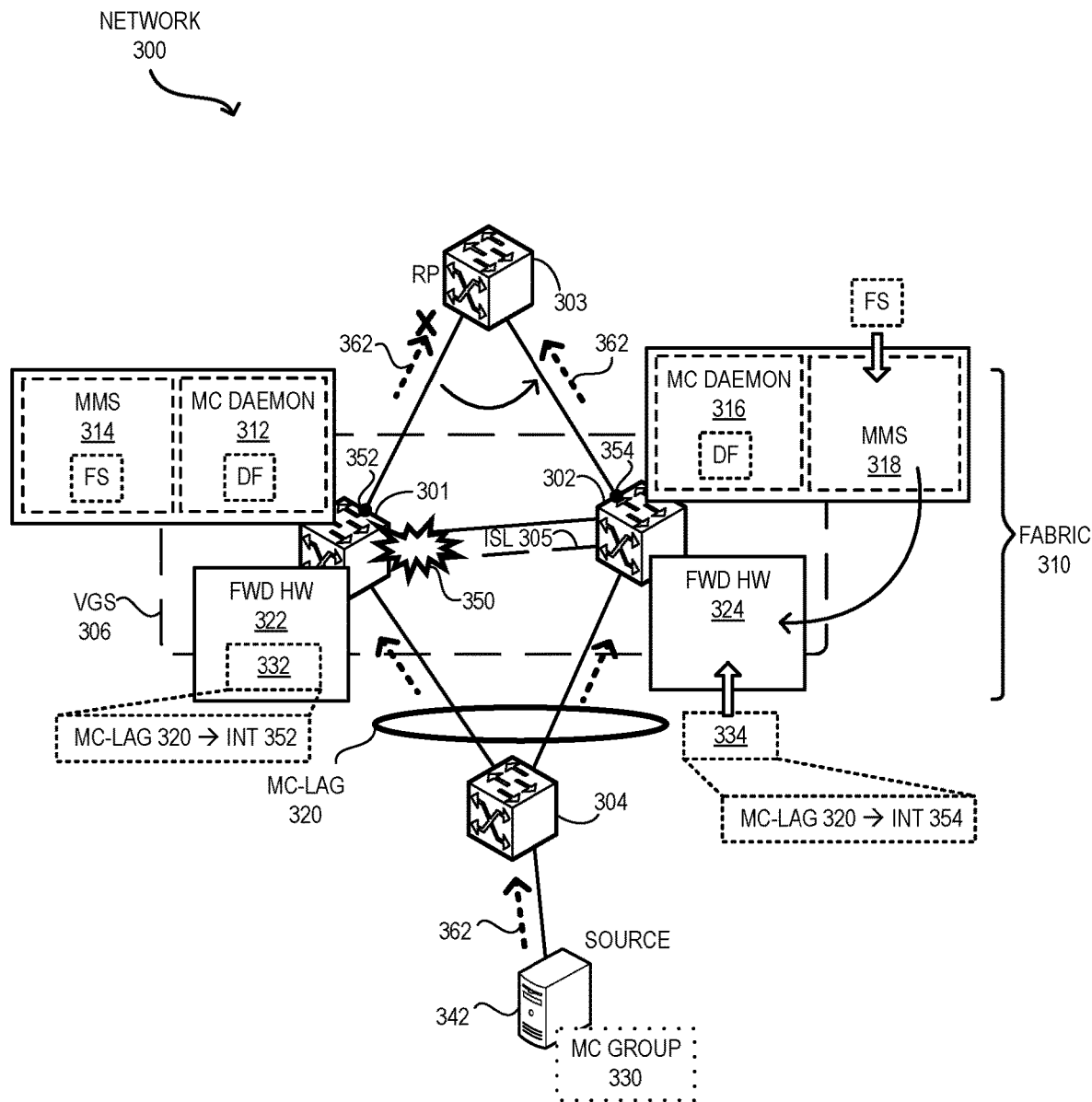
FIG. 3A illustrates an example of facilitating high availability while forwarding bidirectional multicast traffic from a source device, in accordance with an aspect of the present application.

FIG. 3A illustrates an example of facilitating high availability while forwarding bidirectional multicast traffic from a source device, in accordance with an aspect of the present application. A network 300 can include a number of network devices, such as switches 301, 302, 303, and 304. A respective switch in network 300 can be associated with a MAC address and an IP address. An end device 342 can be coupled to switch 304. Switches 301 and 302 can be in a distributed tunnel fabric 310, where the switches can be coupled to each other via tunnels. In fabric 310, tunnel encapsulation is initiated and terminated within fabric 310. In fabric 310, switches 301 and 302 can operate as a single virtual gateway device in conjunction with each other to facilitate a VGS 306. VGS 306 can operate as the gateway switch of fabric 310 and facilitate external communication for fabric 310. To efficiently manage data forwarding, switches 301 and 302 can maintain an ISL 305 between them for sharing control and/or data packets. Switch 304 can be coupled to VGS 306 via an MC-LAG 320.

Switch 303 can be configured as an RP for a multicast group 330. Hence, switch 303 can also be referred to as RP 303 and be the root of an RPMT for multicast group 330. End device 342 can be a source for multicast group 330. If a bidirectional multicast protocol is used to distribute traffic of multicast group 330, the bidirectional multicast traffic of multicast group 330 can be distributed via the RPMT without relying on an SPMT to source device 342. To efficiently forward bidirectional multicast traffic, multicast daemon 312 of switch 301 can elect switch 301 as the DF for multicast group 330. Similarly, multicast daemon 316 of switch 302 can elect switch 302 as another DF for multicast group 330. In other words, a respective multicast daemon instance in VGS 306 can elect the local switch as the DF.

In addition, switch 301 can operate a multicast management system (MMS) 314 that can elect an FS for multicast group 330 at VGS 306 based on one or more selection parameters, such as network addresses, priority values, and user configurations. Similarly, an MMS 318 of switch 302 can also use the same one or more selection parameters to elect the FS. For example, both MMS 314 and MMS 318 can determine that a network address, such as the IP address or the MAC address, of switch 301 has a larger value than that of switch 302. Accordingly, they both elect switch 301 as the FS. Therefore, switch 301 can operate as the forwarding device of multicast traffic in VGS 306. Because switch 302 is elected as DF without being elected as the FS, switch 302 can be a standby DF.

Accordingly, MMS 314 can configure a forwarding entry 332 in forwarding hardware 322 of switch 301. Forwarding entry 332 can include MC-LAG 320 as the ingress interface and a point-to-point interface 352 to RP 203 as the egress interface. Since switch 301 is elected as the FS, MMS 318 can refrain from configuring an entry in forwarding hardware 324 of switch 302. When switch 301 receives multicast traffic 362 associated with multicast group 330 from MC-LAG 320, switch 301 can forward multicast traffic 362 toward RP 303 via interface 352 based on entry 332. Because forwarding hardware 324 may not include an entry for multicast traffic 362, switch 302 can discard multicast traffic 362.

If switch 301 becomes unavailable due to an unavailability event 350 (e.g., a link or node failure), MMS 318 can detect the unavailability via ISL 305. MMS 318 can then elect itself as the FS and program a forwarding entry 334 in forwarding hardware 324. Forwarding entry 334 can include MC-LAG 320 as the ingress interface and a point-to-point interface 354 to RP 203 as the egress interface. From multicast demon 316's perspective, the local switch (i.e., switch 302) is already a DF. Consequently, multicast daemon 316 does not re-initiate the DF election process. Furthermore, switch 302 has been receiving multicast traffic 362 via MC-LAG 320. Therefore, upon programming forwarding entry 334 in forwarding hardware 324, switch 302 can readily start forwarding multicast traffic 362 to RP 303 via interface 354.

Furthermore, if switch 301 recovers from event 350 (e.g., a failed link is restored), MMS 314 can determine that VGS 306 already includes an FS, which is switch 302. Based on the determination, MMS 314 can refrain from applying the selection parameters to determine the FS. Consequently, switch 302 can continue to operate as the FS and forward multicast traffic 336 via interface 354. Even if the selection parameters indicate that switch 301 should be elected as an FS, if an FS is operational in VGS 302, switch 301 does not reelect a new FS. In this way, MMS 314 and MMS 318 can operate in conjunction with each other to facilitate quick convergence of bidirectional multicast traffic during unavailability event 350 and support the efficient transition to the recovery from event 350.

Figure 3B:
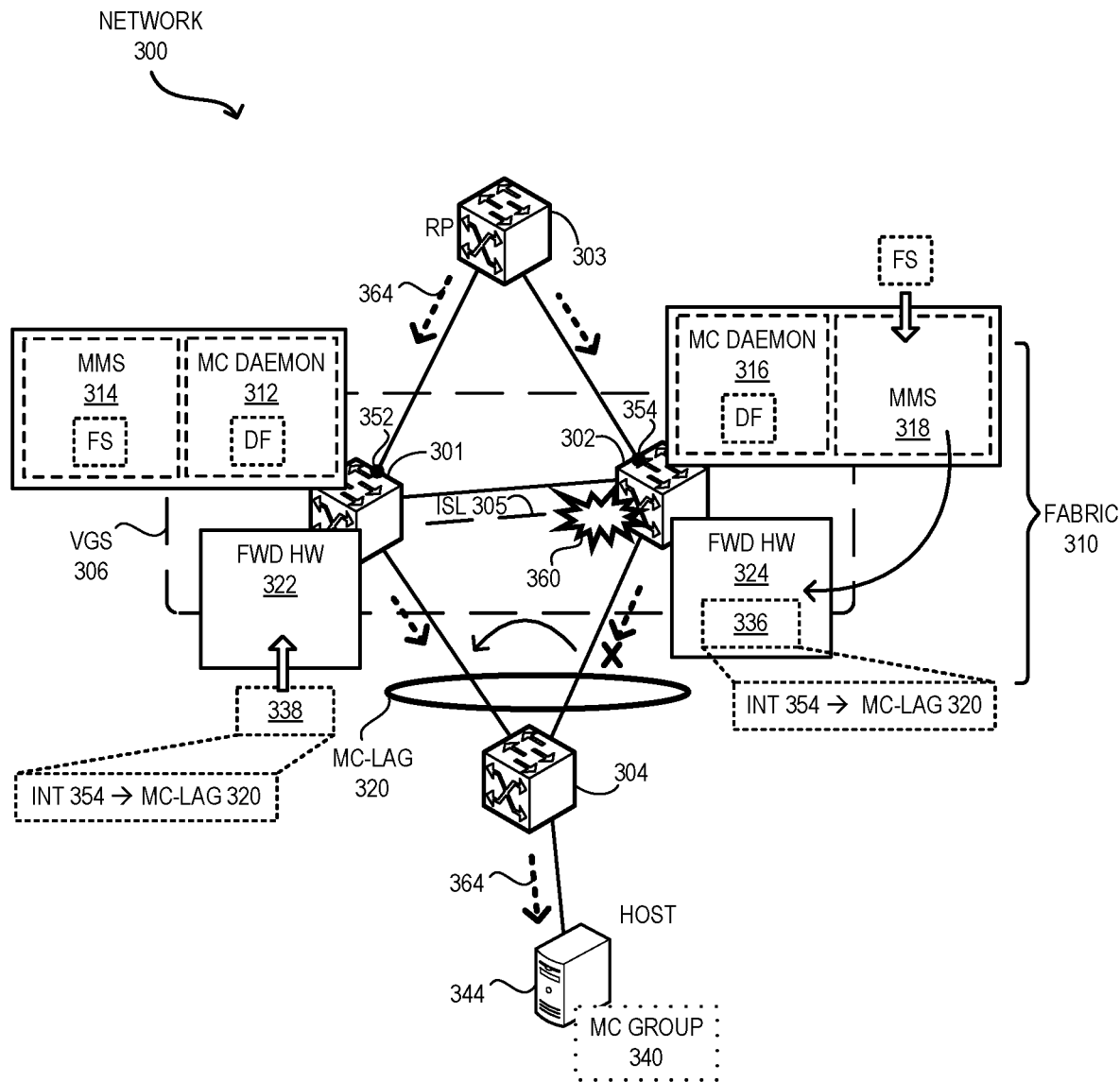
FIG. 3B illustrates an example of facilitating high availability while forwarding bidirectional multicast traffic from an RP, in accordance with an aspect of the present application.

FIG. 3B illustrates an example of facilitating high availability while forwarding bidirectional multicast traffic from an RP, in accordance with an aspect of the present application. In this example, switch 303 can be configured as an RP for a multicast group 340. End device 344 can be a requesting host for multicast group 340. If a bidirectional multicast protocol is used to distribute traffic of multicast group 340, the bidirectional multicast traffic of multicast group 340 can be distributed via the RPMT from RP 303 to host 344. To efficiently forward bidirectional multicast traffic, multicast daemons 312 and 316 can both elect the respective local switch as the DF and send join requests for multicast group 340 to RP 303. Accordingly, switches 301 and 302 both can receive multicast traffic 364 of multicast group 340 from RP 303.

In addition, MMS 314 can elect switch 302 as an FS for multicast group 340 at VGS 306 based on one or more selection parameters. Similarly, MMS 318 can also elect switch 302 as the FS using the same one or more selection parameters to elect the FS. Accordingly, MMS 318 can configure a forwarding entry 336 in forwarding hardware 324 of switch 302. Forwarding entry 336 can include MC-LAG 320 as the egress interface and a point-to-point interface 354 coupling RP 303 as the ingress interface. Since switch 302 is elected as the FS, MMS 314 can refrain from configuring an entry in forwarding hardware 322 of switch 301. When switch 301 receives multicast traffic 364 associated with multicast group 340 via interface 354, switch 302 can forward multicast traffic 364 toward host 344 via MC-LAG 320 based on entry 336. Because forwarding hardware 322 may not include an entry for multicast traffic 364, switch 301 can discard multicast traffic 364.

If switch 302 becomes unavailable due to an unavailability event 360 (e.g., a link or node failure), MMS 314 can detect the unavailability via ISL 305. MMS 314 can then elect itself as the FS and program a forwarding entry 338 in forwarding hardware 322. Forwarding entry 338 can include MC-LAG 320 as the egress interface and a point-to-point interface 352 coupling RP 303 as the ingress interface. From multicast demon 312's perspective, the local switch (i.e., switch 301) is already a DF. Consequently, multicast daemon 312 does not re-initiate the DF election process. Furthermore, switch 301 has been receiving multicast traffic 364 from RP 303. Therefore, upon programming forwarding entry 338 in forwarding hardware 322, switch 301 can readily start forwarding multicast traffic 364 from RP 303 via MAC-LAG 320. Here, switch 301 can continue to operate as the FS even when switch 302 recovers from event 360. In this way, MMS 314 and MMS 318 can operate in conjunction with each other to facilitate quick convergence of bidirectional multicast traffic during unavailability event 360 and support an efficient transition to the recovery from event 360.

Figure 4A:
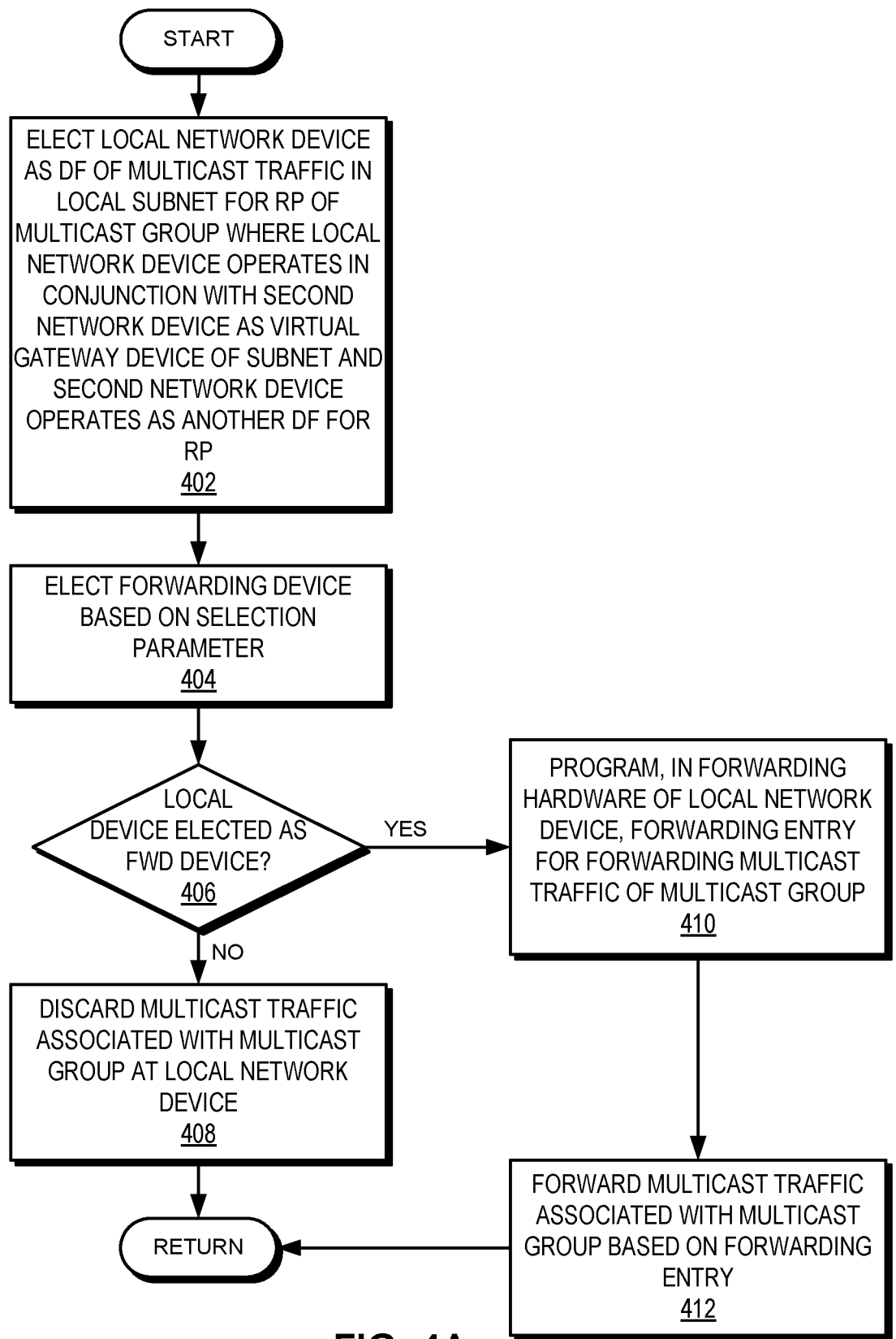
FIG. 4A presents a flowchart illustrating the process of a network device in a virtual gateway device efficiently forwarding bidirectional multicast traffic, in accordance with an aspect of the present application.

FIG. 4A presents a flowchart illustrating the process of a network device in a virtual gateway device efficiently forwarding bidirectional multicast traffic, in accordance with an aspect of the present application. During operation, the network device, which can be a switch, can elect the local network device as a DF of the multicast traffic in the local subnet for an RP of a multicast group. Here, the local network device operates in conjunction with a second network device as a VGS and the second network device operates as another DF for the RP (operation 402). In other words, the network device and the second network device can form a VGS. To ensure efficient forwarding of bidirectional multicast traffic at the VGS, both the network device and the second network device can elect themselves as the DF for the local subnet. Both the network device and the second network device can then receive the multicast traffic.

However, only one network device in the VGS may actively forward bidirectional multicast traffic. Therefore, the network device can elect an FS based on a selection parameter (operation 404). Because each network device of the VGS can independently elect an FS, the elected FS may or may not be the local network device. The selection parameters can include the respective network addresses of the network device and the second network device. The network device and the second network device can independently elect the FS. Therefore, if the selection parameters indicate that the network device is to be elected as the FS, the network device can elect the local network device as the FS. Subsequently, the network device can determine whether the local network device is elected as the FS (operation 406). If the local network device is elected as the FS, the network device can become responsible for forwarding the multicast traffic.

The network device can then program, in the programming hardware of the local network device, a forwarding entry for forwarding the multicast traffic of the multicast group (operation 410). The entry allows the network device to forward traffic associated with the multicast group. Accordingly, the network device can forward the multicast traffic associated with the multicast group based on the forwarding entry (operation 412). For example, if a packet destined to the multicast group is received by the network device, the forwarding hardware can match the entry with the packet, determine an egress interface from the entry, and transmit the packet via the entry. On the other hand, if the local network device is not elected as the FS, the network device can then discard the multicast traffic associated with the multicast group at the local network device (operation 408).

Figure 4B:
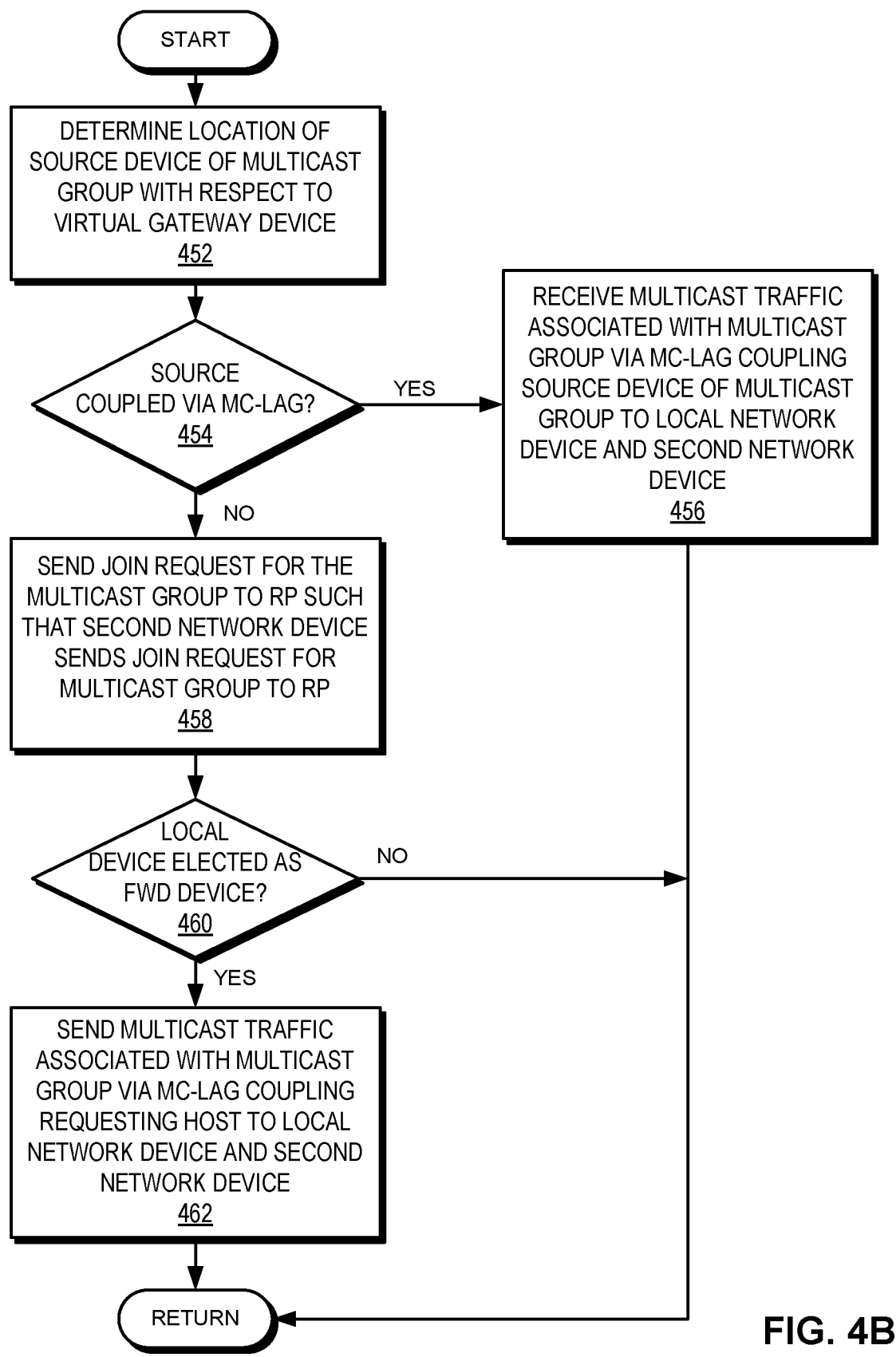
FIG. 4B presents a flowchart illustrating the process of a network device in a virtual gateway device efficiently forwarding bidirectional multicast traffic based on the location of a source device, in accordance with an aspect of the present application.

FIG. 4B presents a flowchart illustrating the process of a network device in a virtual gateway device efficiently forwarding bidirectional multicast traffic based on the location of a source device, in accordance with an aspect of the present application. During operation, the network device can determine the location of the source device of the multicast group with respect to the VGS (operation 452). How a network device forwards bidirectional traffic associated with a multicast group may depend on the location of the source device with respect to the VGS. For example, if the source device is reachable through the VGS via an MC-LAG, the source device can send traffic to the RP via the VGS. On the other hand, if the source device is reachable via the RP, the DFs in the VGS need to obtain the multicast traffic from the RP to provide it to any downstream requesting host.

Accordingly, the network device can determine whether the source device is coupled to the VGS via the MC-LAG (operation 454). If the source device is coupled to the VGS via the MC-LAG, the participating network devices of the VGS and the source device can be in the same broadcast domain (e.g., in the same VLAN). Therefore, if the VGS is formed in conjunction with a second network device, the network device, the second network device, and the source device can be in the same broadcast domain. Hence, the network device can receive the multicast traffic associated with the multicast group via the MC-LAG coupling the source device of the multicast group to the network device and the second network device (operation 456).

On the other hand, if the source device is coupled to the VGS via the MC-LAG, the source device can be coupled to the RP via one or more links. Therefore, to join the RPMT, the network device can send a join request, such as a source-independent (*, G) join request, for the multicast group to the RP such that the second network device also sends a join request for the multicast group to the RP (operation 458). This allows the network device and the second network device to receive the multicast traffic. The network device can then determine whether the local network device is elected as the FS (operation 460). If the local network device is elected as the FS, the forwarding entry associated with the multicast traffic can be programmed in the forward hardware of the network device. Hence, the network device can send the multicast traffic associated with the multicast group via the MC-LAG coupling a requesting host to the local network device and the second network device (operation 462).

Figure 5:
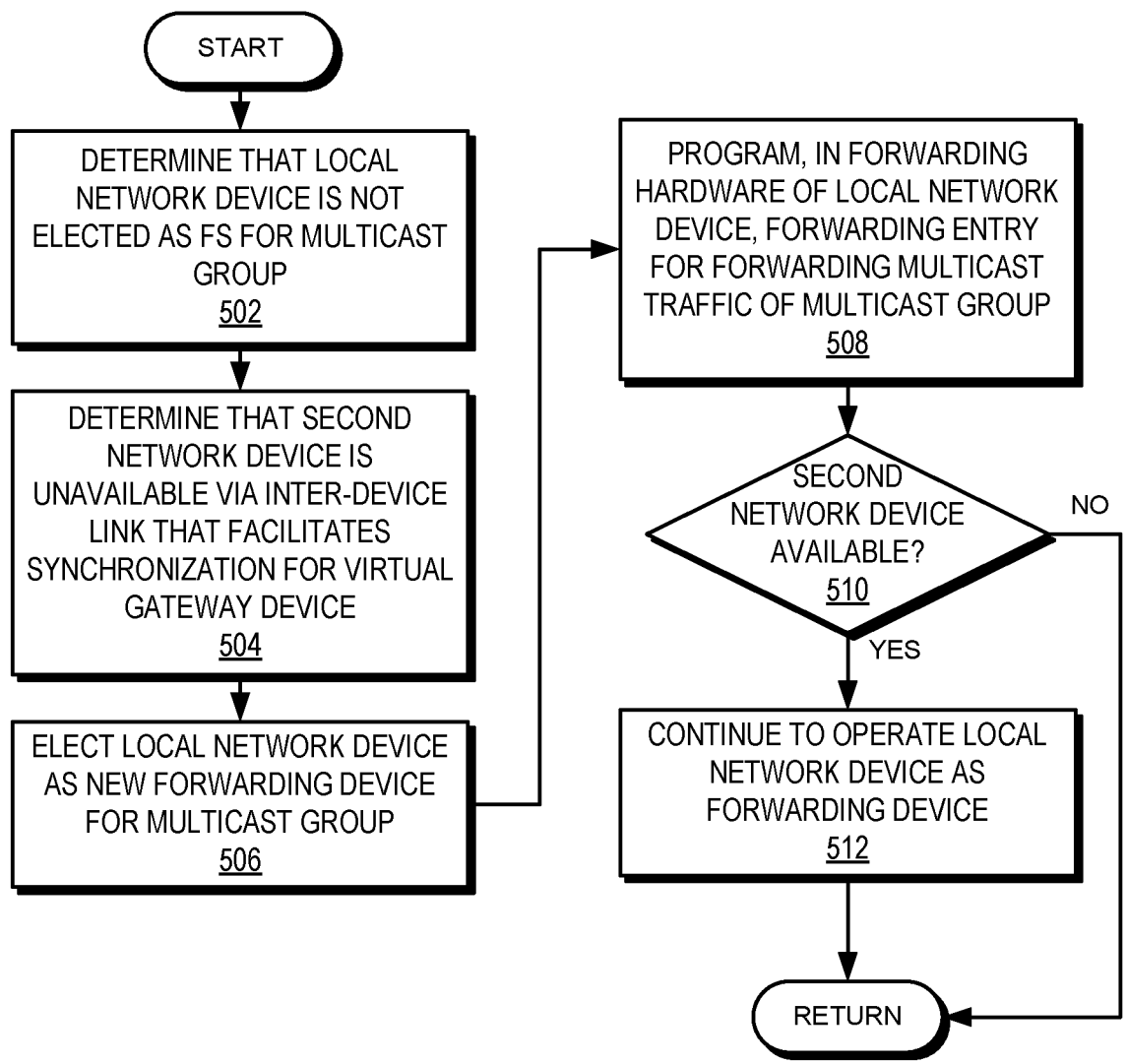
FIG. 5 presents a flowchart illustrating the process of a network device in a virtual gateway device providing high availability while forwarding bidirectional multicast traffic, in accordance with an aspect of the present application.

FIG. 5 presents a flowchart illustrating the process of a network device in a virtual gateway device providing high availability while forwarding bidirectional multicast traffic, in accordance with an aspect of the present application. During operation, the network device can determine that the local network device is not elected as an FS for a multicast group (operation 502). The network device not being elected can indicate that another network device, such as a second network device, of the VGS has been elected as the FS. The network device can then determine that the second network device is unavailable via the ISL that facilitates synchronization for the VGS (operation 504). For example, the participating network devices in the VGS can synchronize their states, such as the routing and forwarding parameters, via the ISL. The synchronization allows the network device to start forwarding traffic upon detecting the unavailability of another network device of the VGS via the ISL.

The unavailability of the second network device can indicate that the VGS does not include an active FS. Therefore, to mitigate the unavailability of the second network device, the network device can elect the local network device as a new FS for the multicast group (operation 506). The network device can then become responsible for forwarding the multicast traffic associated with the multicast group. The network device can then program, in the forwarding hardware of the local network device, a forwarding entry for forwarding multicast traffic of the multicast group (operation 508). The entry allows the network device to forward the subsequent packets associated with the multicast group received at the VGS. The network device can determine whether the second network device has become available (operation 510). For example, if the second network device becomes available, the network device can determine the availability via the ISL. Even if the second network device becomes available, the network device can continue to operate the local network device as the FS (operation 512). In this way, the VGS can bypass the FS reelection process to ensure stable forwarding of the multicast traffic.

Figure 6:
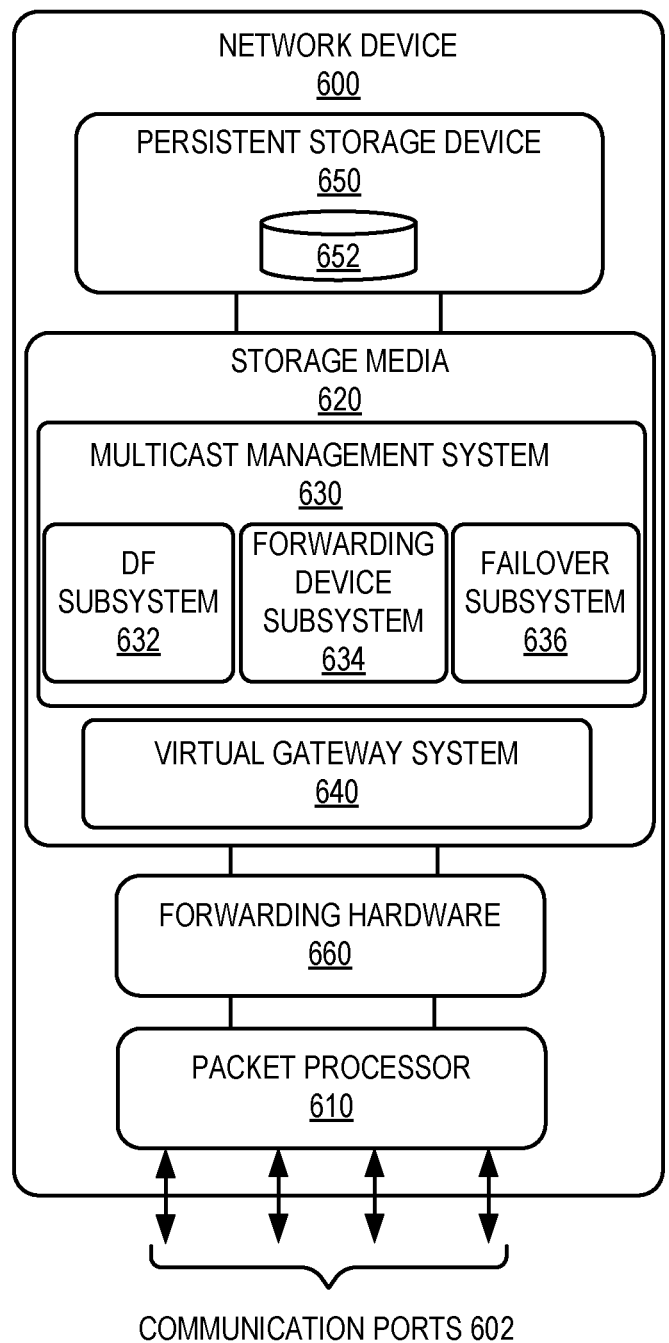
FIG. 6 illustrates an example of a switch supporting efficient forwarding of bidirectional multicast traffic, in accordance with an aspect of the present application.

FIG. 6 illustrates an example of a network device supporting efficient forwarding of bidirectional multicast traffic, in accordance with an aspect of the present application. In this example, a network device 600, which can also be referred to as a switch 600, can include a number of communication ports 602, a packet processor 610, and a persistent storage device 650. Network device 600 can also include forwarding hardware 660 (e.g., processing hardware of network device 600, such as its application-specific integrated circuit (ASIC) chips), which includes information based on which network device 600 processes packets (e.g., determines output ports for packets). Packet processor 610 can extract and process header information from the received packets. Packet processor 610 can identify a network device identifier (e.g., a MAC address and/or an IP address) associated with network device 600 in the header of a packet. Network device 600 can include a storage media 620. In some examples, storage media 620 can include a set of volatile memory devices (e.g., dual in-line memory module (DIMM)).

Communication ports 602 can include inter-device communication channels for communication with other network devices and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Network device 600 can maintain a database 652 (e.g., in storage device 650). Database 652 can be a relational database and may run on one or more Database Management System (DBMS) instances. Database 652 can store information associated with the routing, configuration, and interfaces of network device 600. Database 652 may store the routing data structure. Storage Media 620 can include instructions associated with a virtual gateway system 640. Virtual gateway system 640 can allow network device 600 to operate as a virtual gateway device, such as VGS 106, in a tunnel fabric. To do so, virtual gateway system 640 may operate in conjunction with another network device. Storage Media 620 can include instructions associated with an MMS 630 that can allow network device 600 to efficiently forward bidirectional multicast traffic.

MMS 630 can include a DF subsystem 632, a forwarding device subsystem 634, and a failover subsystem 636. A respective subsystem can include instructions executable by network device 600 to perform one or more operations. DF subsystem 632 can include instructions to elect network device 600 as a DF for a multicast group for which a bidirectional multicast protocol (e.g., BIDIR-PIM) is used for distribution. If a source device is coupled to an RP of the multicast group, DF subsystem 632 can also include instructions to send a join request to the RP of the multicast group to receive the multicast traffic of the multicast group. Forwarding device subsystem 634 can include instructions to determine whether network device 600 is elected as a forwarding device for the multicast group based on a set of selection parameters. Forwarding device subsystem 634 can include instructions to program a forwarding entry associated with the multicast group in forwarding hardware 660 if network device 600 is elected as the forwarding device.

Failover subsystem 636 can include instructions to facilitate high availability upon detecting unavailability associated with the virtual gateway device. If network device 600 is not the forwarding device, another network device of the virtual gateway device has been elected as the forwarding device. Failover subsystem 636 can include instructions to trigger the forwarding device election process if the forwarding device becomes unavailable (e.g., due to an unavailability event). Accordingly, forwarding device subsystem 634 can include instructions to elect network device 600 as a new forwarding device for the multicast group and program a forwarding entry associated with the multicast group in forwarding hardware 660. Furthermore, failover subsystem 636 can include instructions to preclude network device 600 from initiating the forwarding device reelection process if the previous forwarding device recovers from the unavailability event. As a result, network device 600 can continue to operate as the forwarding device.

The description herein is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

One aspect of the present technology can provide a first network device in a network. During operation, the first network device can elect the first network device as a designated forwarder (DF) of multicast traffic in a subnet for a Rendezvous Point (RP) of a multicast group. Here, the first network device can operate in conjunction with a second network device as a virtual gateway network device of the subnet. The second network device can also be elected as another DF for the RP. The first network device can elect, based on a selection parameter, a forwarding device for forwarding the multicast traffic from the virtual gateway network device. Subsequently, the first network device can determine whether the first network device is elected as the forwarding device. Upon determining that the first network device is elected as the forwarding device; the first network device can program, in the forwarding hardware of the first network device, a forwarding entry for forwarding the multicast traffic. The first network device can then forward the multicast traffic associated with the multicast group based on the forwarding entry.

In a variation on this aspect, upon determining that the first network device is not elected as the forwarding device, the first network device can discard the multicast traffic associated with the multicast group.

In a further variation, the first network device can determine that the second network device is unavailable via an inter-device link that couples the first network device to the second network device. The first network device can then select itself as the forwarding device and program, in the forwarding hardware, a forwarding entry for forwarding the multicast traffic to operate the first network device as the forwarding device.

In a further variation, upon determining that the second network device has become available, the first network device can continue to operate the first network device as the forwarding device.

In a variation on this aspect, the first network device can receive the multicast traffic associated with the multicast group via a multi-chassis link-aggregation group (MC-LAG) coupling a source of the multicast group to the first and second network devices.

In a variation on this aspect, the first network device can send a first join request for the multicast group to a source of the multicast group. Here, the second network device sends a second join request for the multicast group to the source.

In a further variation, the first network device can send the multicast traffic associated with the multicast group via an MC-LAG coupling the requesting host to the first and second network devices.

In a variation on this aspect, the selection parameter can include one or more of: a value of an Internet Protocol (IP) address, a value of a media access control (MAC) address, and a priority value.

In a variation on this aspect, the RP can operate based on Bidirectional Protocol Independent Multicast (PIM).

In a variation on this aspect, the first network device can forward the multicast traffic associated with the multicast group by receiving the multicast traffic via a first virtual local area network (VLAN) and forwarding the multicast traffic via a second VLAN.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block or a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method comprising:
electing, by a first network device in a subnet, the first network device as a designated forwarder (DF) of multicast traffic in the subnet for a Rendezvous Point (RP) of a multicast group, wherein the first network device operates in conjunction with a second network device as a virtual gateway network device of the subnet, and wherein the second network device is elected as another DF for the RP;
electing, by the first network device based on a selection parameter, a forwarding device for forwarding the multicast traffic from the virtual gateway network device;
determining, by the first network device, whether the first network device is elected as the forwarding device;
in response to determining that the first network device is elected as the forwarding device, programming, in forwarding hardware of the first network device, a forwarding entry for forwarding the multicast traffic; and
forwarding the multicast traffic associated with the multicast group based on the forwarding entry.

2. The method of claim 1, further comprising, in response to determining that the first network device is not elected as the forwarding device, discarding, by the first network device, the multicast traffic associated with the multicast group.

3. The method of claim 2, further comprising:
determining that the second network device is unavailable via an inter-device link that couples the first network device to the second network device;
selecting the first network device as the forwarding device; and
programming, in the forwarding hardware, a forwarding entry for forwarding the multicast traffic to operate the first network device as the forwarding device.

4. The method of claim 3, further comprising, in response to determining that the second network device has become available, continuing to operate the first network device as the forwarding device.

5. The method of claim 1, further comprising receiving the multicast traffic associated with the multicast group via a multi-chassis link-aggregation group (MC-LAG) coupling a source of the multicast group to the first and second network devices.

6. The method of claim 1, further comprising sending, by the first network device, a first join request for the multicast group to a source of the multicast group, wherein the second network device sends a second join request for the multicast group to the source.

7. The method of claim 6, further comprising sending the multicast traffic associated with the multicast group via an MC-LAG coupling the requesting host to the first and second network devices.

8. The method of claim 1, wherein the selection parameter includes one or more of: a value of an Internet Protocol (IP) address, a value of a media access control (MAC) address, and a priority value.

9. The method of claim 1, wherein the RP operates based on Bidirectional Protocol Independent Multicast (PIM).

10. The method of claim 1, wherein forwarding the multicast traffic associated with the multicast group further comprises receiving the multicast traffic via a first virtual local area network (VLAN) and forwarding the multicast traffic via a second VLAN.

11. A non-transitory computer-readable storage medium storing instructions that when executed by a processor of a first network device in a network cause the processor to perform a method, the method comprising:
   electing, in a subnet, the first network device as a designated forwarder (DF) of multicast traffic in the subnet for a Rendezvous Point (RP) of a multicast group, wherein the first network device operates in conjunction with a second network device as a virtual gateway network device of the subnet, and wherein the second network device is elected as another DF for the RP;
   electing, based on a selection parameter, a forwarding device for forwarding the multicast traffic from the virtual gateway network device;
   determining whether the first network device is elected as the forwarding device;
   in response to determining that the first network device is elected as the forwarding device, programming, in forwarding hardware of the first network device, a forwarding entry for forwarding the multicast traffic; and
   forwarding the multicast traffic associated with the multicast group based on the forwarding entry.

12. The non-transitory computer-readable storage medium of claim 11, wherein, in response to determining that the first network device is not elected as the forwarding device, the method further comprises discarding the multicast traffic associated with the multicast group.

13. The non-transitory computer-readable storage medium of claim 12, wherein the method further comprises:
   determining that the second network device is unavailable via an inter-device link that couples the first network device to the second network device;
   selecting the first network device as the forwarding device; and
   programming, in the forwarding hardware, a forwarding entry for forwarding the multicast traffic to operate the first network device as the forwarding device.

14. The non-transitory computer-readable storage medium of claim 13, wherein, in response to determining that the second network device has become available, the method further comprises continuing to operate the first network device as the forwarding device.

15. The non-transitory computer-readable storage medium of claim 11, wherein the method further comprises receiving the multicast traffic associated with the multicast group via a multi-chassis link-aggregation group (MC-LAG) coupling a source of the multicast group to the first and second network devices.

16. The non-transitory computer-readable storage medium of claim 11, wherein the method further comprises sending a first join request for the multicast group to a source of the multicast group, wherein the second network device sends a second join request for the multicast group to the source.

17. The non-transitory computer-readable storage medium of claim 16, wherein the method further comprises sending the multicast traffic associated with the multicast group via an MC-LAG coupling the requesting host to the first and second network devices.

18. The non-transitory computer-readable storage medium of claim 11, wherein the selection parameter includes one or more of: a value of an Internet Protocol (IP) address, a value of a media access control (MAC) address, and a priority value.

19. The non-transitory computer-readable storage medium of claim 11, wherein the RP operates based on Bidirectional Protocol Independent Multicast (PIM).

20. A computer system, comprising:
   a processing resource;
   forwarding hardware; and
   a non-transitory machine-readable medium comprising instructions executable by the processing resource to:
      elect, in a subnet, the computer system as a designated forwarder (DF) of multicast traffic in the subnet for a Rendezvous Point (RP) of a multicast group, wherein the computer system operates in conjunction with a second computer system as a virtual gateway network device of the subnet, and wherein the second computer system is elected as another DF for the RP;
      elect, based on a selection parameter, a forwarding device for forwarding the multicast traffic from the virtual gateway network device;
      determine whether the computer system is elected as a forwarding device based on a selection parameter;
      in response to determining that the computer system is elected as the forwarding device, program, in the forwarding hardware, a forwarding entry for forwarding the multicast traffic; and
   forward multicast traffic associated with the multicast group based on the forwarding entry.

\* \* \* \* \*